United States Patent [19]                [11]  4,385,134
Foscante et al.                                     [45]  May 24, 1983

[54] ORGANOTIN POLYSILOXANE AND ACRYLIC ANTIFOULING COATING

[75] Inventors: Raymond E. Foscante, Yorba Linda; Charles D. Stevens, Long Beach; Lee M. Parson, Inglewood, all of Calif.

[73] Assignee: Ameron, Inc., Monterey Park, Calif.

[21] Appl. No.: 312,686

[22] Filed: Oct. 19, 1981

[51] Int. Cl.$^3$ .................. A01N 9/00; C08G 77/04; C09D 5/16; C09D 5/38

[52] U.S. Cl. .................................. 523/177; 524/77; 524/413; 524/500; 525/185; 525/342

[58] Field of Search ......... 260/27 R, 31.4 R, 33.6 SB, 260/429.7; 424/184, 288; 525/185, 342; 523/177; 524/77, 500, 413

[56] References Cited

U.S. PATENT DOCUMENTS 4,080,190  3/1978  Law et al. .................. 106/18.35
4,139,515  2/1979  Dennington ............... 260/29.6 MM
4,227,929  10/1980 Law et al. .................. 106/1.17
4,311,629  1/1982  Gysegem .................. 260/33.6 SB Primary Examiner—Melyn I. Marquis
Assistant Examiner—Herbert J. Lilling
Attorney, Agent, or Firm—Christie, Parker & Hale

[57] ABSTRACT

A marine antifouling coating composition comprises an acrylic resin such as methyl methacrylate in the range of from 6 to 20% by weight, a polysiloxane having substituted thereon tributyltin moieties that are toxic to marine organisms. The polysiloxane is in the range of from 7 to 25% by weight. The acrylic resin and polysiloxane are dissolved in a solvent in the range of from 18 to 52% by weight with the balance of the composition in the range of from 10 to 65% by weight being primarily conventional marine paint and toxicant agents for augmenting action of the tributyltin polysiloxane. Copper or copper salts that are effective for inhibiting growth of marine organisms and facilitating release of toxins can also be included.

51 Claims, No Drawings

ORGANOTIN POLYSILOXANE AND ACRYLIC ANTIFOULING COATING

FIELD OF THE INVENTION

This invention relates to marine antifouling coating compositions including an acrylic resin and a trisubstituted organotin substituted polysiloxane in a paint mixture. Preferably, the compositions also include copper or a copper salt for inhibiting marine fouling.

BACKGROUND

When a ship moves through the water the drag resistance or water frictional forces which must be overcome are responsible for as much as half of the power consumed in operation of the vessel. The surface condition of the hull is a major factor inducing drag. It is therefore desirable to have an extremely smooth surface on the hull and paint formulations have been developed that are very smooth when cured and/or are polished by moving water to provide an extremely smooth surface. It is desirable to have a coating material that exhibits this polishing action to produce a microsmooth surface to minimize the drag penalty due to microroughness.

Fouling of the hull by pestiferous marine organisms is a major source of drag. The use of antifouling protective coating on a ship's hull is a primary approach to controlling fouling and the resulting drag. The antifouling coating inhibits growth of marine organisms on the hull to keep it smooth. Coatings can also be used on static structures exposed to seawater to minimize growth of organisms that could cause deterioration of such structures.

A truly effective antifouling coating meets at least three criteria: (1) It will possess broad spectrum antifouling efficacy (i.e., inhibit growth of a broad variety of organisms) for extended periods of time, usually three years; (2) it will possess a smooth surface so as not to cause a microroughness drag penalty; and (3) it will actively reduce drag by reducing the roughness profile of the surface.

To meet the first criterion it is necessary to deliver to the surface of the coating in a controlled fashion, minimum effective amounts of toxin or fouling control agents. The amount of toxin delivered at the surface should not be substantially above the minimum effective amount for inhibiting fouling to avoid premature depletion of the antifouling agent.

One technique for controlling release of toxin involves the use of latent toxicants which are activated by an environmental or chemical trigger such as hydrolysis. This is the principal behind the operation of organotin polysiloxane materials as described in U.S. Pat. No. 4,080,190. In these materials a trisubstituted organotin moiety is chemically bonded to a macromolecular polysiloxane backbone. Through hydrolysis the organotin moiety is gradually liberated and diffuses to the surface of the coating as the active fouling control agent.

The organotin polysiloxane materials can act as binders, co-resins, or toxic pigments or additives depending on the tin to silicon ratio and related physical form. A low tin to silicon ratio permits the organotin polysiloxane to perform as a binder. Such material is primarily inorganic in nature though the presence of the organotin groups do impart a certain degree of organic character. This enhances compatability with organic materials and better adhesion to metal substrates, for example, than a polysiloxane without organotin substitution.

As a binder the organotin polysiloxane can serve as a matrix for essentially inorganic fillers and pigments. The coating is microporous allowing continual release of the toxic agent; that is, an organotin radical is formed in situ through hydrolysis of the tin-oxygen-silicon bond. Such continual release of toxicant avoids surface passivation as frequently occurs in conventional copper based antifouling coatings. Since this type of formulation is microporous, performance is essentially independent of turbulence; that is, sufficient toxicant is leached to the surface for preventing fouling under either static or dynamic conditions.

With a higher tin to silicon ratio the organotin polysiloxane can be an additive in a coating composition using a variety of binders. In such a composition the release of toxicant is a function of the properties of the binder plus hydrolysis characteristics of the organotin polysiloxane.

BRIEF SUMMARY OF THE INVENTION

There is, therefore, provided in practice of this invention according to presently preferred embodiments, a marine antifouling coating composition comprising an acrylic resin in the range of from about 6 to 20% by weight, a polysiloxane having substituted thereon trisubsituted organotin moieties that are toxic to marine organisms, the polysiloxane being in the range of from about 7 to 25% by weight, a solvent for the acrylic resin and polysiloxane in the range of about 18 to 52% by weight with the balance of the composition in the range of from about 10 to 65% by weight being primarily conventional marine paint and toxicant agents for augmenting action of the organotin polysiloxane. It is particularly preferred that the composition also include copper or copper salts that are effective for inhibiting growth of marine organisms and facilitating the release of toxins by controlling the seawater sensitivity of the film.

DESCRIPTION

The marine antifouling coating composition provided in practice of this invention comprises a mixture of resins or binders, solvent and pigments or fillers, along with associated marine paint and antifouling ingredients in a consistency suitable as a paint for brushing, spraying, or the like on ship hulls or other structures exposed to seawater.

The binders in the composition comprise an acrylic resin in the range of from about 6 to 20% by weight and an organotin substituted polysiloxane in the range of from about 7 to 25% by weight. A volatile organic solvent for the acrylic resin and polysiloxane is preferably present in the range of from about 18 to 52% by weight. The balance of the composition in the range of from about 10 to 65% by weight comprises conventional plasticizers, a small amount of water soluble resin, pigment powders, fillers, thickening agents, antisettling agents, copper powder, copper salts, zinc oxide, algicides, clay, talc, metal oxides and the like.

It is particularly desirable that the composition include copper powder or cuprous salts that are effective for inhibiting growth of marine organisms. The combination of organotin polysiloxane, acrylic resin and copper supplying antifouling agent appears to avoid passivation of the copper bearing antifouling agent which often occurs in seawater. Preferably the copper or cuprous salt is present in a proportion of up to about 30% by weight.

The acrylic resin is selected from the group consisting of methyl methacrylate, ethyl methacrylate, propyl methacrylate, isobutyl methacrylate, and n-butyl methacrylate. Such materials can be used separately or as polymer blends. Preferably the acrylic resin is polymethyl methacrylate since economical, readily commercially available, and an excellent resin for marine coatings. The methyl methacrylate forms a microsmooth coating and has appropriate characteristics in moving seawater to maintain a low drag profile on a vessel.

The acrylic resin is present in the composition in the range of from about 6 to 20% by weight. If the acrylic resin is present in a proportion less than about 6% by weight, adhesion of the coating to metal substrates can be excessively degraded. Further, the microsmoothness and ablation characteristics of the resultant coating may not be adequate for minimizing drag when used on a ship or the like. If the proportion of acrylic resin is more than about 20% by weight, the amount of polysiloxane in the composition may need to be reduced to a level that the antifouling properties of the coating are degraded.

Preferably the acrylic resin is present in the range of from about 8 to 12% by weight. Such proportions are found to give an excellent balance of adhesion of the coating composition to a variety of substrates, microsmoothness and ablation characteristics suitable for reducing drag and long life as an antifouling coating. A particularly preferred composition has from about 10 to 11% by weight of acrylic resin.

The organotin polysiloxane comprises a polymeric precursor having the formula

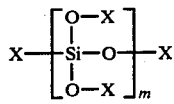

where m is in the range up to an average of about 10 and preferably is an average of at least about 5. In this formula each X is independently selected from the group consisting of R and Y. Each R is selected from the group consisting of hydrogen, and alkyl and alkoxyalkyl radicals containing less than six carbon atoms. Each Y in the formula is a trisubstituted organotin radical having the formula:

In this organotin moiety $R_1$, $R_2$ and $R_3$ are independently selected from the group consisting of alkyl, cycloalkyl, and aryl radicals and collectively contain up to about 18 carbon atoms. Preferably $R_1$, $R_2$ and $R_3$ are each butykl for optimum toxicity of the composition to marine organisms. Triphenyl tin polysiloxane can be substituted for some of the tributyl tin siloxane in some embodiments.

Preferably the R radical on the polysiloxane is ethyl. When the siloxane is polymerized by hydrolysis and condensation, the reaction by-product is ethyl alcohol which has a volatility similar to the organic solvents in the composition, thereby making the composition readily applicable as a paint. If desired, the polysiloxane can be prehydrolyzed when making up the composition to speed polycondensation in which case at least a portion of R is hydrogen. Such prehydrolysis can reduce the shelf life of the composition.

Such organotin polysiloxane and methods for making them are described in U.S. Pat. No. 4,080,190, which is hereby incorporated by reference.

In the polysiloxane m represents the average number of silicon atoms per molecule. Generally there is a random distribution of molecules having more or less than m silicon atoms. For example, when m=5, molecules containing 4, 5 and 6 silicon atoms can be present. Preferably, m is less than about 10 so that the siloxane can be properly polymerized by hydrolysis and polycondensation during curing of the coating composition. Preferably m is an average of about 5. Such a polysiloxane can polymerize, following transesterification to introduce the organotin moiety, to produce linear and/or cross-linked polymers. Such material has a high silica content, hence a relatively high proportion of solid binder following polycondensation and removal of the preferred ethyl radical.

The X's in the formula are selected so that the ratio of the tin atoms to silicon atoms in the organotin polysiloxane is in the range of from about 0.7:5 to 5:5.

If the ratio of tin atoms to silicon atoms in the composition is less than about 0.7 tin atoms for every 5 silicon atoms, the quantity of the trisubstituted tin moiety can be so low that toxicity of the coating to marine organisms is marginal. When the tin to silicon ratio is low, extensive cross-linking of the polysiloxane can be obtained so that the polysiloxane forms a durable binder in the coating composition. This permits a higher proportion of polysiloxane and a lower proportion of acrylic resin in the composition without degrading the desired mechanical properties of the resultant coating.

The proportion of tin atoms to silicon atoms should be less than about 5:5 for polymerization of the polysiloxane. The trisubstituted tin moiety on the polysiloxane introduces sufficient steric hindrance that at high tin to silicon ratios cross-linking is inhibited. Thus, with high tin to silicon ratios, the mechanical properties of the polymerized siloxane are reduced. In such an embodiment the proportion of acrylic resin to polysiloxane is increased for maintaining the mechanical properties of the coating. At high tin to silicon ratios in the polysiloxane, conventional plasticizers may be omitted as the polysiloxane blend with the acrylic resin can provide sufficient plasticizing.

Preferably, the tin to silicon ratio in the polysiloxane is in the range of from about 1.3:5 to 2.5:5. A particularly preferred composition has a ratio of tin atoms to silicon atoms of about 2.5:5. A composition having a ratio of about 1.3 tin atoms for every 5 silicon atoms in the polysiloxane forms an excellent binder for the coating composition with sufficient trisubstituted organotin moiety for high toxicity of marine organisms. Such a composition can be useful where a durable antifouling coating is desired with low polishing action. In such an embodiment a relatively higher proportion of polysiloxane and relatively lower proportion of acrylic resin may be used in the composition. A particularly preferred composition has a ratio of about 2.5 tin atoms per 5 silicon atoms. Such material is not completely cross-linked and serves to modulate the properties of the acrylic resin in the coating composition. A high proportion of tin moiety is present in the composition providing long life antifouling characteristics. Such a material has about the optimum balance of mechanical properties and toxicity.

It will be recognized that the quantity of organotin polysiloxane binder in the composition following hydrolysis and condensation will be less than the proportion of organotin siloxane in the uncured coating composition. For example, when the organotin siloxane comprises a tributyl tin moiety on an ethoxy siloxane wherein each molecule has an average of five silicon atoms and the ratio of tin atoms to silicon atoms is about 2.5:5, the cured siloxane has about 73% of the weight of the uncured precursor. The weight loss comes about from loss of the ethyl radical upon hydrolysis and condensation.

The acrylic resin and organotin polysiloxane in the composition act as co-resins forming a binder for a paint coating. Evaporation of the solvent from the composition and exposure of the composition to environmental water or water vapor results in solidification of the binder blend through deposition of the acrylic resin and concurrent hydrolytic polycondensation of the siloxane. Depending on the proportions of the materials, this binder system can be in the form of a resin blend or an interpenetrating polymer network.

Preferably the organotin polysiloxane is present in the composition in the range of from about 7 to 25% by weight. If the proportion is less than about 7% by weight, the quantity of the organotin moiety can become so low that the antifouling characteristics of the composition can be too low for practical use. The rate of release of toxicant at the coating surface can be less than the minimum required for inhibiting growth of organisms.

If the proportion of organotin polysiloxane in the composition is more than about 25% by weight, the mechanical properties of the organotin polysiloxane can predominate over those of the acrylic resin, thereby reducing the desirable properties of the acrylic. Further, high proportions of organotin polysiloxane can reduce the content of other toxicants such as copper bearing antifouling agents, thereby narrowing the spectrum of organisms against which the antifouling coating is effective.

Preferably the organotin polysiloxane is present in the composition in the range of from about 12 to 16% by weight. This gives a good balance of the antifouling properties of the siloxane and the mechanical properties of the acrylic. Such a coating has a long useful lifetime in both static and dynamic fouling control situations.

Preferably the quantity of organotin polysiloxane is somewhat larger than the proportion of acrylic resin in the composition. Preferably the weight ratio of acrylic resin to organotin polysiloxane is in the range of from about 0.5 to 1.0 and most particularly in the range of from about 0.6 to 0.8. These provide optimum balance of antifouling characteristics in the combination of controlled release of toxicant and mechanical properties in the resultant coating.

As co-resins in the binder system the organotin polysiloxane moderates the physical properties of the acrylic resin. Ordinarily, a polysiloxane is incompatible with an acrylic resin, however, it is found that the presence of the trisubstituted organotin moiety on the polysiloxane makes the two types of binder compatible so that a coating composition with reasonable shelf life can be formulated.

In the cured composition, the acrylic in the binder provides a microsmooth surface that minimizes microroughness drag penalty, and a slow controlled polishing action can be obtained for providing maximum reduction of drag. In the preferred embodiment of this invention, the surface profile roughness envelope is in the 15 to 25 micron range throughout the service life of the coating and its ablation rate is less than 3 microns of coating loss per month at a speed of 15 knots. The organotin moiety in the binder is released at a controlled rate since it is chemically bonded to a polymeric content of the coating and is not free to migrate or diffuse before hydrolysis frees the tin moiety from the polysiloxane.

In other compositions in which an acrylic resin is used as binder and antifouling agents are included as additives, such as cuprous salts or tributyltin oxide, the toxicant is released at a rate controlled only by matrix properties. Since diffusion rate depends on concentration, release of toxicant at the surface is relatively high when the coating is fresh and diminishes steadily thereafter. To maintain an effective release rate at the surface after a long time, an excessive release rate is needed in the beginning.

In a composition with organotin polysiloxane and acrylic resin, release of toxicant occurs upon hydrolysis of the tin-oxygen-silicon bond. The rate of release is thus controlled by the rate of hydrolysis which remains steady throughout the life of the coating. Since the rate of release is nearly constant, the amount of toxicant can be selected to provide slightly more than an effective amount at the projected end of the useful life of the coating. Little excess toxicant is released during the early life of the coating and longer life can be obtained for a selected total amount of toxicant.

An organic solvent for the acrylic resin and organotin polysiloxane is preferably present in the range of from about 18 to 52% by weight. Xylene is an excellent solvent for both the acrylic resin and polysiloxane. In an exemplary embodiment acrylic resin is included in the composition by way of a commercially available solution of acrylic resin and toluene. In such an embodiment the solvent in the composition comprises a blend of toluene and xylene. Other nonpolar solvents for acrylic resin and polysiloxane can also be used, along with limited amounts of alcohols. Exemplary solvents are xylene, toluene, various Cellosolves, naphtha and mineral spirits. The organic solvents should be selected to provide a volatility that permits drying of the coating composition in a reasonable time when applied to the hull of a vessel or other substrate.

The proportion of solvent in the composition is subject to rather wide variation and is determined largely by the desired viscosity in the composition to permit application to substrates by spraying, brushing, or the like. If the proportion of solvent is less than about 18% by weight, the viscosity of the composition may be so high that application to substrates in coatings of reasonable thickness is rather difficult. Levelling to obtain a smooth coating may also be inhibited. If the composition has more than about 52% by weight of solvent, application of coatings of reasonable thickness can be limited by sagging or running. Preferably, the solvent is present in the range of from about 24 to 36% by weight. It is found that such a proportion of solvent with the preferred resin compositions and other marine paint additives hereinafter described provides a viscosity range quite suitable for application to substrates by brushing and/or spraying.

A variety of other ingredients can form the balance of the composition in the range of from about 10 to 65% by weight. Such additional ingredients are conventional additions to marine paints and are employed for modifying the properties of the coating composition or providing antifouling toxicity.

In addition to the organotin substituted polysiloxane, other marine antifouling ingredients can be included in the composition, in particular it is found desirable to include up to about 30% by weight of copper powder and/or cuprous salts, such as $Cu_2O$, $CuSCN$, $Cu_2S$, $CuOH$, or the like in the composition. Cuprous oxide is a preferred copper base antifouling agent. Such copper based materials are widely recognized as agents for inhibiting growth of marine organisms and are desirable additives in the marine coating composition. Preferably such copper base antifouling agents are present in the composition in the range of from about 10 to 20% by weight.

When the copper bearing antifouling agent is present at less than about 10 weight percent, the minimum effective release rate may not be achieved over a long lifetime of the coating. If the proportion is much above about 20%, passivation of the copper agent may occur under some conditions.

It is desirable to include copper bearing antifouling agents in the composition for enlarging the spectrum of marine organisms combated by the antifouling coating. Copper and cuprous salts tend to be somewhat more effective for inhibiting growth of algae and more primitive soft organisms, whereas the organotin moiety is somewhat more effective against higher organisms, barnacles or the like, which are often referred to as "hard" fouling. When the proportion of copper base antifouling agent is on the order of about 15% by weight, good long-life antifouling characteristics are obtained without decreasing the other desirable properties of the coating.

When a copper based antifouling agent is included in the composition, it is also desirable to include zinc oxide in a proportion of about one-half the proportion of copper base antifouling agent. The zinc oxide is desirable since it potentiates the antifouling activity of the copper by enhancing the transport of copper ion across the biological membranes of marine organisms. Zinc oxide can also promote galvanic release of copper from the antifouling coating. An excess amount of zinc oxide can suppress the antifouling activity of the copper, hence, it is desirable that the maximum zinc oxide be in a proportion of about 50% of the copper base antifoulant. If zinc is included in the composition, the proportion of zinc oxide should be reduced.

It is believed that no single toxicant is available for compositions that can be applied to surfaces in practical situations and that will universally protect marine surfaces against fouling. While organotin compounds are very effective as antifouling toxicants, practical compositions that provide controlled release of toxicant over long periods of time do not have sufficiently broad antifouling properties for the full spectrum of organisms. It is found, however, that by combining the organotin polysiloxane with other toxicants, such as copper or cuprous salts or organic algicides, the antifouling performance of the coating can be effective in a wide variety of fouling environments for periods of time far in excess of conventional coatings. This effectiveness is present under both static and turbulent conditions. This differs from prior compositions for controlled release of toxicants which are optimized for either static or dynamic conditions, rather than both.

It is particularly advantageous to employ copper bearing antifouling agents such as copper powder or cuprous salts as an additional toxicant in a coating composition having trisubstituted organotin polysiloxane and acrylic resin as binders. Ordinarily in a seawater environment at least a portion of the copper is converted to inactive salts, such as copper oxychlorides, which are relatively ineffective in inhibiting growth of marine fouling organisms. The reason that the acrylic and organotin polysiloxane binders tend to stabilize the copper or copper salts in seawater is not yet understood. It is believed that with organotin polysiloxane in the composition, the amount of copper bearing antifouling agent can be reduced, as compared with prior compositions, without reducing antifouling activity. Lower copper concentration may avoid passivation.

Preferably the weight ratio of trisubstituted organotin polysiloxane to copper powder or cuprous salt in the composition is in the range of from about 0.5 to 1.5. When the ratio is either above or below this range there is a decrease in the spectrum of organisms combated by the antifouling composition. A proportion near the middle of this range appears to give the best broad spectrum antifouling activity. It is also desirable that the weight ratio of binders to copper powder or cuprous salt be in the range of from about 0.8 to 2 to provide an appropriate range of strength and controlled release of toxicant for good long life antifouling activity. When the ratio of binder to copper bearing antifouling agent is less than about 0.8 the erosin resistance of the coating and the life of the copper constituent can be significantly reduced. If the proportion of binder relative to the copper bearing constituent is more than about 2, there is a reduction in the availability of copper at the surface and a decrease in the antifouling activity, particularly for algae and soft organisms against which copper is particularly effective.

Preferably, the composition includes a conventional plasticizer for the binders in the range of from about 0.5 to 5% by weight, and most preferably about 0.5 to 2% by weight. The plasticizer imparts flexibility and resilience to the cured composition. External plasticizers that maintain their molecular identity are preferred, rather than plasticizers that chemically bond in the polymer system. A variety of conventional plasticizers that are compatible with the acrylic resin and organotin polysiloxane are suitable, such as alkyl benzyl, phthalates, dialkyl phthalates, phosphate esters, sulfonamides, butyl phthalyl butyl glycolate, diphenyl phthalate, dicyclohexyl phthalate, tricresyl phosphate, and the like. The amount of plasticizer employed in the composition is somewhat proportioned to the tin to silicon ratio in the polysiloxane. A smaller amount of plasticizer can be used when the tin to silicon ratio is high since the polysiloxane can also act as a plasticizer. Conversely, when the tin to silicon ratio is low so that the polysiloxane is extensively cross-linked and rigid, a somewhat higher proportion of other plasticizer can be included in the composition.

It is desirable to include a slightly water soluble resin in the composition for enhancing gradual dissolution and ablation of the coating. Addition of such resins that are slightly soluble in seawater enhances the microporosity of the coating and can help control the hydrolysis of the organotin moiety for maintaining antifouling characteristics over a long lifetime. Preferably, the water soluble resin is water white rosin, since it is economical, easily blended into the composition, and quite suitable in stability and water solubility. Other slightly soluble resins can be substituted such as hydroxy ethyl methacrylate, polyvinyl acetate, polyvinyl alcohol, or the like.

The proportion of water soluble resin in the composition depends on the degree of solubility of the resin and desired rate of ablation and penetration of water into the coating. For example, when rosin is the seawater soluble portion of the composition, it is preferably present in the range of from about 1 to 10% by weight, and most preferably in the range of from about 3 to 6% by weight. If the rosin is present at less than about 1% by weight, the coating may become passivated, and antifouling characteristics degraded, particularly when copper or copper salts are included in the composition. Rosin content of more than about 10% by weight leads to excessive ablation and short lifetime of such a coating. Preferably, rosin is present in the range of from about 3 to 6% by weight, to provide a good balance of coating lifetime and water penetration to provide long antifouling activity.

It is highly desirable to include a thixotropic agent such as alcohol swellable clay, talc, or colloidal silica. Such conventional thickeners are widely used in paint compositions for modifying viscosity and obtaining paints that can be sprayed or brushed to provide a coating of reasonable thickness without sagging or running. An exemplary thickening agent particularly useful is dimethyl dioctodecyl ammonium bentonite available from the Baroid Division of National Lead Company, Houston, Texas, as Bentone 34. Preferably the thickener is present in the composition in the range of from about 0.5 to 4% by weight and most preferably in the range of from about 0.5 to 2.0% by weight, as is conventional in paint compositions.

It is desirable to include antisettling agents for the copper base materials and other fillers and pigments employed in the composition. A variety of antisettling agents used in paint compositions are suitable for preventing settling and minimizing mixing that might be needed before a composition is used after a prolonged shelf life. Antisettling agents are employed in marine paint compositions up to about 3% by weight.

If desired, organic algicides can be included in the composition, such as dichlorisothiazalone or diiodomethyl p-tolyl sulfone. Preferably, such algicides are present in a proportion up to about 16% by weight, and most preferably up to about 5% by weight. Such algicides can promote gelling of the composition and the proportions are preferably kept low enough to inhibit such gelling and maintain a long shelf life.

A variety of conventional fillers and pigments can also be included in the coating composition. Such materials can modify the properties of the paint as it is applied, such as body to promote good spreading and leveling without runs or sags. Such materials can also modify properties of the cured coating such as strength, toughness, opacity and color. Pigments and fillers can also help protect the substrate on which the coating composition is placed. Exemplary pigments and fillers include red iron oxide, talc, silica, titanium dioxide, chromium oxide, and the like.

Such pigments and fillers can be included in the composition up to about 20% by weight. If present in a proportion more than about 20% by weight, it becomes necessary to reduce the proportions of algicides and other ingredients in the composition that are active in inhibiting growth of marine organisms. Preferably the pigments and fillers are present in the order of about 7% by weight which provides good protection for substrates, opacity and strength.

The proportions of liquid and solid ingredients are selected so that the composition can be sprayed or brushed onto a variety of substrates as a marine paint.

Miscellaneous other ingredients can also be included in the composition. Zinc powder can be included for inhibiting corrosion. A small amount of phosphoric acid (e.g., 0.5%) can be included for inhibiting premature gelling. The composition is preferably packaged in a single container for ready use as a paint. If desired it can be prepared in two packages for longer shelf life and mixed shortly before use. Many other modifications and variations will be apparent.

When the coating composition is applied to a surface, concurrent effects are occurring in the acrylic and polysiloxane binders. The acrylic resin forms a solid binder network as the volatile solvents evaporate. The organotin polysiloxane hydrolyzes and condenses. If desired, the polysiloxane can be at least partially hydrolyzed before application of the coating. Such prehydrolysis can be desirable for rapid cure of the coating but the shelf life of the mixture may be decreased. Hydrolysis of the polysiloxane can occur from ambient water vapor of exposure to water. A variety of bases or acids can be present in small quantities to promote hydrolysis as described in U.S. Pat. No. 4,080,190. Algicides, zinc oxide and other ingredients in the composition can be sufficient to promote hydrolysis. It might be noted that use of some basic promoters of hydrolysis may not be totally compatible with copper bearing antifouling agents. Such promoters may be omitted or the composition used within a reasonable time after mixing, or the copper bearing materials can be added shortly before applying the coating.

EXAMPLES

Table I sets forth the compositions of six antifouling coating compositions prepared in practice of this invention. The compositions were mixed much as one would mix other paint compositions. The compositions were applied to standard test panels by spraying and the test panels were immersed in seawater at Daytona Beach, Florida, for determining antifouling activity.

TABLE I

| INGREDIENT | EXAMPLES | | | | | |
|---|---|---|---|---|---|---|
| | A | B | C | D | E | F |
| Acryloid B-48N | 26.8 | 26.8 | 17.8 | 18.0 | 26.8 | 22.5 |
| OTPS | 15.3 | 15.2 | 12.2 | 12.4 | 15.2 | 14.7 |
| Cuprous oxide | — | 22.2 | 19.0 | 18.7 | 17.0 | 15.5 |
| Zinc oxide | 8.0 | 8.8 | 8.8 | 8.9 | 9.0 | 7.5 |
| Ethyl aminoethanol | 0.8 | 0.8 | — | — | 1.1 | 0.8 |
| Di-isodecylphthalate | 1.0 | 2.0 | 1.3 | 1.2 | 2.0 | 1.2 |
| W. W. Rosin | 4.2 | 4.8 | 5.8 | 5.9 | 4.8 | 4.0 |
| Red iron oxide | 11.4 | — | 2.8 | 7.4 | — | 2.4 |
| Nytal 300 | 7.0 | 2.5 | 2.5 | — | 3.0 | 2.1 |
| MPA-1078X | — | — | 1.9 | — | — | 1.6 |
| Bentone 34 | 1.5 | 1.3 | 0.9 | 0.9 | 0.7 | 1.1 |
| Neosol | 0.4 | 0.4 | 0.3 | 0.2 | 0.2 | 0.3 |
| Amical 48 | — | — | 6.0 | — | — | — |
| C-9211 | 6.0 | 6.0 | — | 6.1 | 6.0 | 6.6 |
| Xylene | 17.6 | 9.2 | 20.7 | 18.5 | 14.2 | 19.7 |
| TOTAL | 100.0 | 100.0 | 100.0 | 100.0 | 100.0 | 100.0 |

The proportions of ingredients listed in Table I are set forth in percentages by weight for each of the six coating compositions. The materials set forth in Table I are identified as follows:

Acryloid B-48N comprises a solution of methyl methacrylate in toluene available from Rohm and Haas, Philadelphia, Pennsylvania. The solution has 45% by weight polymethyl methacrylate and 55% by weight toluene.

OTPS refers to organotin polysiloxane. In each of the coating compositions set forth in Table I, the organotin polysiloxane had the formula:

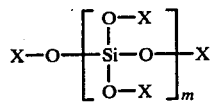

where m was an average of about 5 and X was either an ethyl radical or a tributyl tin radical and the X's were selected so that the ratio of tin atoms to silicon atoms was about 2.5:5.

Cuprous oxide is present as a finely divided powder which, as pointed out above, inhibits growth of marine organisms. Zinc oxide is also present as a finely divided powder and serves as a pigment plus potentiating the activity of the copper salt.

Ethyl aminoethanol is present in the composition to promote hydrolysis and condensation of the siloxane. Di-isodecylphthalate is present as an external plasticizer for the acrylic and siloxane binders. W. W. rosin (water white rosin) is present as a slightly water soluble resin to modify the binder matrix and help control gradual release of toxicants when the coating is immersed in seawater.

Red iron oxide is present in the form of a powder serving as a pigment. The pigment improves the strength and opacity of the composition. Nytal 300 is a finely divided talc available from R. T. Vanderbilt Company, Norwalk, Connecticut. The talc is present as a filler that improves viscosity of the coating composition and inhibits sagging.

MPA-1078X available from Baker Castor Oil Company, Bayonne, New Jersey, is a colloidal thixotropic agent used to prevent settling of solid powders. It is added as a paste of solids dispersed in a solvent of xylene or toluene.

Bentone 34, available from National Lead Company, Baroid Division, Houston, Texas, is finely divided dimethyl dioctodecyl ammonium bentonite for thickening the composition and aiding in suspension of solids.

Neosol, available from Shell Chemical Company, Houston, Texas, is ethyl alcohol denatured with small amounts of methyl isobutyl ketone, ethyl acetate and aviation gasoline. As a preliminary step in formulating the coating composition the Neosol is mixed with the Bentone 34 to form a paste and cause swelling of the Bentone 34.

Amical-48 available from Abbott Laboratories, North Chicago, Illinois, comprises di-iodomethyl p-tolyl sulfone and serves as an additional algicide.

C-9211 is a 4,5-dichloro-2-n-octyl-4-isothiazalin-3-one algicide available from Rohm and Haas Company, Philadelphia, Pennsylvania. The algicide can also provide a source of protons to promote hydrolysis of the siloxane. It is desirable in preparing a composition to add the algicide after all of the other ingredients have been mixed to minimize the possibility of premature gelation.

The composition is made by first diluting the acrylic resin solution with additional solvent. Some of the xylene can be reserved for making a paste of the solid ingredients to speed mixing. The organotin polysiloxane is added and mixed, followed by the plasticizer. After all of the liquid and soluble materials have been mixed, the solid materials are added with as much mixing shear as required to obtain a smooth paint composition. The order of adding ingredients to the composition is not critical, although it is desirable to add the algicide or any catalyzing amine last in order to minimize premature gelation.

The coating compositions set forth in Table I were applied to standard blank panels of primer coated steel or plastic for measuring resistance to marine fouling. These panels were then exposed to seawater at Daytona Beach, Florida. The fouling resistance of the composition as a function of months of exposure is set forth in Table II.

TABLE II

| EXAMPLE | HARD FOULING | | | | ALGAL FOULING | | | |
|---|---|---|---|---|---|---|---|---|
| | 6 | 12 | 18 | 24 Mos. | 6 | 12 | 18 | 24 Mos. |
| A | 10 | 10 | 10 | 10 | 9 | 5 | 5 | 0 |
| B | 10 | 10 | 10 | 10 | 10 | 9 | 9 | 9 |
| C | 10 | 10 | 9 | — | 10 | 10 | 10 | — |
| D | 10 | 10 | 9 | — | 10 | 10 | 10 | — |
| E | 10 | 10 | 10 | — | 10 | 10 | 10 | — |
| F | 10 | 10 | 10 | — | 10 | 10 | 10 | — |
| Control | 0 | 0 | 0 | 0 | 0 | 0 | 0 | 0 |

Control panel refers to a blank panel with no antifouling coating. Hard fouling refers to the growth of barnacles and similar organisms with hard body parts. Algal fouling refers to algae and other soft organisms. The ratings of the test panels for fouling resistance is on a scale of 0 to 10, where 10 represents no fouling whatsoever, 9 represents a very minor or trace amount of fouling, 5 represents approximately 50% of the test panel fouled and 0 represents complete failure or fouling over the entire surface.

What is claimed is:

1. A marine antifouling coating composition comprising:
   an acrylic resin selected from the group consisting of methyl methacrylate, ethyl methacrylate, propyl methacrylate, isobutyl methacrylate, and n-butyl methacrylate in the range of from 6 to 20 percent by weight;
   an organotin polysiloxane having the formula

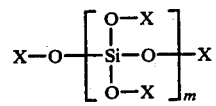

where m is an average of up to about ten, each X is independently selected from the group consisting of R and Y; where each R is selected from the group consisting of hydrogen and alkyl and alkoxyalkyl radicals containing less than six carbon atoms; where each Y is a trisubstituted tin radical having the formula

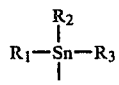

where $R_1$, $R_2$, and $R_3$ are independently selected from the group consisting of alkyl, cycloalkyl and aryl radicals and $R_1$, $R_2$, and $R_3$ contain collectively up to 18 carbon atoms; and the X's are selected so that the ratio of tin atoms to silicon atoms is in the range of from 0.7:5 to 5:5, the organotin polysiloxane being in the range of from 7 to 25 percent by weight;

solvent for the acrylic resin and polysiloxane in the range of from 18 to 52 percent by weight; and a balance in the range of from 10 to 65 percent by weight of primarily marine paint and toxicant agents selected from the group consisting of pigment powders, fillers, thickening agents, antisettling agents, copper powder, cuprous salts, zinc oxide, algicides, silica, clay, talc, metal oxides, plasticizers and slightly water soluble resins.

2. A composition as recited in claim 1 wherein the acrylic resin is present in the range of from 8 to 12 percent by weight.

3. A composition as recited in claim 2 wherein the organotin polysiloxane is present in the range of from 12 to 16 percent by weight.

4. A composition as recited in claim 1 wherein the organotin polysiloxane is present in the range of from 12 to 16 percent by weight.

5. A composition as recited in claim 1 wherein the X's are selected so that the ratio of tin atoms to silicon atoms is in the range of from 1.3:5 to 2.5:5.

6. A composition as recited in claim 5 wherein the acrylic resin comprises polymethyl methacrylate in the range of from 8 to 12 percent by weight.

7. A composition as recited in claim 6 wherein the organotin polysiloxane is present in the range of from 12 to 16 percent by weight.

8. A composition as recited in claim 5 wherein the organotin polysiloxane is present in the range of from 12 to 16 percent by weight.

9. A composition as recited in claim 1 comprising a copper base antifouling agent selected from the group consisting of copper powder and cuprous salts in the range of from 10 to 30 percent by weight.

10. A composition as recited in claim 9 wherein the acrylic resin is present in the range of from 8 to 12 percent by weight.

11. A composition as recited in claim 10 wherein the organotin polysiloxane is present in the range of from 12 to 16 percent by weight.

12. A composition as recited in claim 9 wherein the organotin polysiloxane is present in the range of from 12 to 16 percent by weight.

13. A composition as recited in any of claims 2, 3, 4, 5, 6, 7, 8, 9, 10, 11 or 12, comprising a plasticizer for acrylic resin in the range of from 0.5 to 5 percent by weight.

14. A composition as recited in any of claims 2, 3, 4, 5, 6, 7, 8, 9, 10, 11 or 12, comprising a slightly water soluble resin in the range of from 1 to 10 percent by weight.

15. A composition as recited in any of claims 2, 3, 4, 5, 6, 7, 8, 9, 10, 11 or 12, wherein the solvent is present in the range of from 24 to 36 percent by weight.

16. A composition as recited in any of claims 2, 3, 4, 5, 6, 7 or 8 wherein the balance of marine paint and toxicant agents is in the range of from 30 to 45 percent by weight.

17. A composition as recited in claim 1 wherein m in the formula is an average of at least about 5.

18. A composition as recited in claim 17 wherein $R_1$, $R_2$, and $R_3$ are each butyl.

19. A composition as recited in claim 1 wherein $R_1$, $R_2$, and $R_3$ are each butyl.

20. A composition as recited in claim 19 wherein R is selected from the group consisting of hydrogen and ethyl radical.

21. A composition as recited in claim 20 wherein the X's are selected so that the ratio of tin atoms to silicon atoms is in the range of from 1.3:5 to 2.5:5.

22. A composition as recited in claim 21 wherein m in the formula is an average of at least about 5.

23. A composition as recited in claim 1 wherein the weight ratio of acrylic resin to organotin polysiloxane is in the range of from 0.5 to 1.0.

24. A composition as recited in claim 23 wherein the weight ratio of acrylic resin to organotin polysiloxane is in the range of from 0.6 to 0.8.

25. A composition as recited in claim 1 comprising a copper bearing antifouling agent selected from the group consisting of copper powder and cuprous salts wherein the weight ratio of organotin polysiloxane to the copper bearing antifouling agent is in the range of from 0.5 to 1.5.

26. An antifouling coating composition comprising:
an acrylic resin binder;
an organotin polysiloxane having the formula:

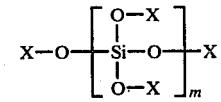

where m is an average of up to about 10, each X is independently selected from the group consisting of R and Y, where each R is selected from the group consisting of hydrogen and ethyl radical, where each Y is a tributyl tin radical and the X's are selected so that the ratio of tin atoms to silicon atoms is in the range from 0.7:5 to 5:5;

copper bearing antifouling agent selected from the group consisting of copper powder and cuprous salts;

a volatile organic solvent for the acrylic resin and organotin polysiloxane; and a sufficient balance of paint and toxicant agents selected from the group consisting of pigment powders, fillers, thickening agents, antisettling agents, zinc oxides, algicides, silica, clay, talc, metal oxides, plasticizers and slightly water soluble resin for forming a marine paint.

27. A composition as recited in claim 26 wherein the weight ratio of the organotin polysiloxane to the copper bearing antifouling agent is in the range of from 0.5 to 1.5.

28. A composition as recited in claim 27 wherein the copper bearing antifouling agent is present in the range of from 10 to 30 percent by weight of the composition.

29. A composition as recited in claim 27 wherein the weight ratio of acrylic resin to organotin polysiloxane is in the range of from 0.5 to 1.0.

30. A composition as recited in claim 27 wherein the weight ratio of acrylic resin to organotin polysiloxane is in the range of from 0.6 to 0.8.

31. A composition as recited in claim 26 wherein the weight ratio of acrylic resin to organotin polysiloxane is in the range of from 0.5 to 1.0.

32. A composition as recited in claim 31 wherein the copper bearing antifouling agent is in the range of from 10 to 30 percent by weight of the composition.

33. A composition as recited in claim 32 wherein the organotin polysiloxane is present in the range of from 7 to 25 percent by weight of the composition.

34. A composition as recited in claim 33 wherein the acrylic resin is present in the range of from 6 to 20 percent by weight of the composition.

35. A composition as recited in claim 26 wherein the organotin polysiloxane is present in the range of from 7 to 25% by weight of the composition.

36. A composition as recited in claim 35 wherein the copper bearing antifouling agent is present in the range of from 10 to 30 percent by weight of the composition.

37. A marine antifouling paint comprising:
an acrylic resin binder;
an organotin polysiloxane having the formula

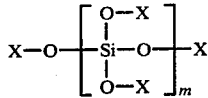

where m is an average of up to about 10, each X is selected independently from the group consisting of R and Y, where each R is selected from the group consisting of hydrogen and alkyl and alkoxyalkyl radicals containing less than six carbon atoms, where each Y is a trisubstituted tin radical having the formula

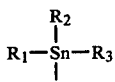

where $R_1$, $R_2$, and $R_3$ are independently selected from the group consisting of alkyl, cycloaklky and aryl radicals and $R_1$, $R_2$, and $R_3$ contain collectively up to about 18 carbon atoms and the X's are selected so that the ratio of tin atoms to silicon atoms is in the range of from 0.7:5 to 5:5; and
a copper bearing antifouling agent selected from the group consisting of copper powder and cuprous salts.

38. A marine paint as recited in claim 37 wherein the organotin polysiloxane is present in the range of from 7 to 25 percent by weight of the paint.

39. A marine paint as recited in claim 38 wherein the copper bearing antifouling agent is present in the range of from 10 to 30 percent by weight of the paint.

40. A marine paint as recited in claim 37 wherein the copper bearing antifouling agent is present in the range of from 10 to 30 percent by weight of the paint.

41. A marine paint as recited in any of claims 37, 38, 39, or 40, wherein the weight ratio of organotin polysiloxane to copper bearing antifouling agent is in the range of from 0.5 to 1.5.

42. A marine paint as recited in any of claims 37, 38, 39, or 40 wherein the acrylic resin is present in the range of from 6 to 20 percent by weight of the paint.

43. A marine antifouling coating composition comprising:
polymethyl metharcrylate in the range of from about 8 to 12 percent by weight;
an organotin polysiloxane having the formula

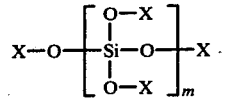

where m is an average of at least about 5, each X is independently selected from the group consisting of R and Y, wherein each R is selected from the group consisting of hydrogen and ethyl radical, where Y is a tributyl tin radical and the X's are selected so that the ratio of tin atoms to silicon atoms is in the range of from 1.3:5 to 2.5:5, the organotin polysiloxane being present in the range of from 12 to 16 percent by weight;
a solvent for the acrylic resin and organotin polysiloxane in the range of from 24 to 36 percent by weight;
a copper bearing antifouling agent selected from the group consisting of copper powder and cuprous salts in the range of from 10 to 30 percent by weight;
a plasticizer compatible with the acrylic resin and organotin polysiloxane in the range of from 0.5 to 5 percent by weight;
rosin in the range of from 1 to 10 percent by weight; and
a balance of primarily marine paint and toxicant agents selected from the group consisting of pigment powders, fillers, thickening agents, antisettling agents, zinc oxide, algicides, silica, clay, talc, and metal oxides.

44. A marine antifouling coating composition comprising:
an acrylic resin in the range of from 6 to 20 percent by weight;
a polysiloxane having substituted thereon trisubstituted organotin moieties that are toxic to marine organisms, the proportion of organotin moiety relative to the silicon content of the polysiloxane being sufficient for the polysiloxane to be compatible with the acrylic resin, the polysiloxane being in the range of from 7 to 25 percent by weight;
a solvent for the acrylic resin and the polysiloxane, in the range of from 18 to 52 percent by weight; and
a balance in the range of from 10 to 65 percent by weight of primarily marine paint and toxicant agents selected from the group consisting of pigment powders, fillers, thickening agents, antisettling agents, copper powder, cuprous salts, zinc oxide, algicides, silica, clay, talc, metal oxides, plasticizers, and slightly water soluble resins.

45. A composition as recited in claim 44 comprising a copper bearing antifouling agent selected from the group consisting of copper powder and cuprous salts in the range of from 10 to 30 percent by weight.

46. A composition as recited in claim 45 wherein the ratio of tin atoms to silicon atoms is in the range of from 1.3:5 to 2.5:5.

47. A composition as recited in claim 44 wherein the ratio of tin atoms to silicon atoms is in the range of from 1.3:5 to 2.5:5.

48. A composition as recited in claim 47 wherein the polysiloxane is present in the range of from 12 to 16 percent by weight.

49. A composition as recited in claim 44 wherein the polysiloxane is present in the range of from 12 to 16 percent by weight.

50. A composition as recited in any of claims 44, 45, 46, 47, 48 or 49 wherein the acrylic resin comprises polymethyl methacrylate in the range of from 8 to 12 percent by weight.

51. A composition as recited in any of claims 44, 46, 47, 48, or 49 comprising a copper base antifouling agent selected from the group consisting of copper powder and cuprous salts in the range of from 10 to 20 percent by weight.

* * * * *